United States Patent [19]

Kato

[11] Patent Number: 5,653,142

[45] Date of Patent: Aug. 5, 1997

[54] INTERMITTENTLY ROTARY GEARING

[76] Inventor: Humio Kato, 851-9, Tyuo 2-chome, Higashiyamato-shi, Tokyo, Japan

[21] Appl. No.: 596,675

[22] Filed: Feb. 5, 1996

[51] Int. Cl.$^6$ ............................. F16H 33/02; F16H 35/02
[52] U.S. Cl. ................. 74/112; 74/113; 74/393; 74/665 GA; 185/40 R
[58] Field of Search ........................ 74/112, 113, 125.5, 74/393, 665 GA; 185/40 R

[56] References Cited

FOREIGN PATENT DOCUMENTS

| 4-175550 | 6/1992 | Japan . |
| 4-370449 | 12/1992 | Japan . |
| 5-312245 | 11/1993 | Japan . |

*Primary Examiner*—Charles A. Marmor
*Assistant Examiner*—Troy Grabow
*Attorney, Agent, or Firm*—Beveridge, DeGrandi, Weilacher & Young, L.L.P.

[57] ABSTRACT

To provide an intermittently rotary gearing that converts rotary motion of a motor to intermittent rotary motion by utilizing a mechanical structure, an input shaft interlocking with a drive shaft of the motor is provided, a first gear and a second gear both interlocking with the input shaft when at least the input shaft is rotated in the power output direction of the motor are provided around the input shaft, and a first coiled spring is fitted to the first gear and second gear so as to extend over the bosses thereof. A first divisional shaft and a second divisional shaft are provided in parallel to the input shaft and also coaxially to each other. A third gear rotatable in the same direction as the first gear via an interlocking means is provided around the first divisional shaft, a fourth gear engaging with the second gear and rotatable in the direction opposite to that of the second gear is provided around the second divisional shaft, and a second coiled spring is fitted to the third gear and fourth gear so as to extend over the bosses thereof. A one-way clutch is fitted around the first divisional shaft and around which the third gear is fitted and/or a one-way clutch is fitted around the second divisional shaft and around which the fourth gear is fitted.

3 Claims, 4 Drawing Sheets

FIG. I

INTERMITTENTLY ROTARY GEARING

FIELD OF THE INVENTION

This invention relates to an intermittently rotary gearing that converts rotary motion of a motor to intermittent rotary motion by utilizing a mechanical structure.

BACKGROUND OF THE INVENTION

As gearings that can change rotary motion, it is common to use gearings employing a pulse motor, a servo motor or the like to change the rotary motion by electrical control. In such gearings, however, the motors such as the pulse motor and the servo motor themselves are expensive and also electric circuits for controlling such motors must be provided, resulting in a very high price as the whole device.

Gearings that mechanically change the rotary motion by utilizing various types of cam mechanisms are also known in the art, where, however, a high precision is required in the designing and manufacture of the cams. Moreover, interlocking mechanisms around the cams are required in order to achieve the intended movement, so that the device must be made complicated, also resulting in a high production cost.

Meanwhile, in Japanese Patent Application Laid-open No. 4-175550, the present inventor has already proposed a variable-speed rotary gearing made up of gears, one-way clutches and coiled springs. In the variable-speed rotary gearing, a variable rotary motion that periodically repeats acceleration and deceleration can be obtained through a drive shaft of a motor rotating at a constant speed.

The gearing disclosed in Japanese Patent Application Laid-open No. 4-175550, however, is a gearing that performs variable-speed rotation repeating acceleration and deceleration, and it has been impossible to perform intermittent rotary motion.

SUMMARY OF THE INVENTION

Accordingly, an object of the present invention is to provide an intermittently rotary gearing that converts rotary motion of a motor to intermittent rotary motion by utilizing a mechanical structure.

To achieve the above object, the intermittently rotary gearing of the present invention comprises;

an input shaft interlocking with a drive shaft of a motor;

a first gear provided around the input shaft and interlocking with the input shaft when at least the input shaft is rotated in the power output direction of the motor;

a second gear provided around the input shaft and interlocking with the input shaft when at least the input shaft is rotated in the power output direction of the motor;

a first coiled spring one end of which is fitted around a boss of the first gear and the other end of which is fitted around a boss of the second gear;

a first divisional shaft provided in parallel to the input shaft;

a second divisional shaft provided coaxially to said first divisional shaft;

a third gear provided around the first divisional shaft and rotatable in the same direction as the first gear via an interlocking means;

a fourth gear provided around the second divisional shaft, and engaging with the second gear so as to be rotatable in the direction opposite to the second gear;

a second coiled spring one end of which is fitted around a boss of the third gear and the other end of which is fitted around a boss of the fourth gear; and a one-way clutch fitted around the first divisional shaft and around which the third gear is fitted and/or a one-way clutch fitted around the second divisional shaft and around which the fourth gear is fitted.

DESCRIPTION OF THE PREFERRED EMBODIMENTS

Figure 1:
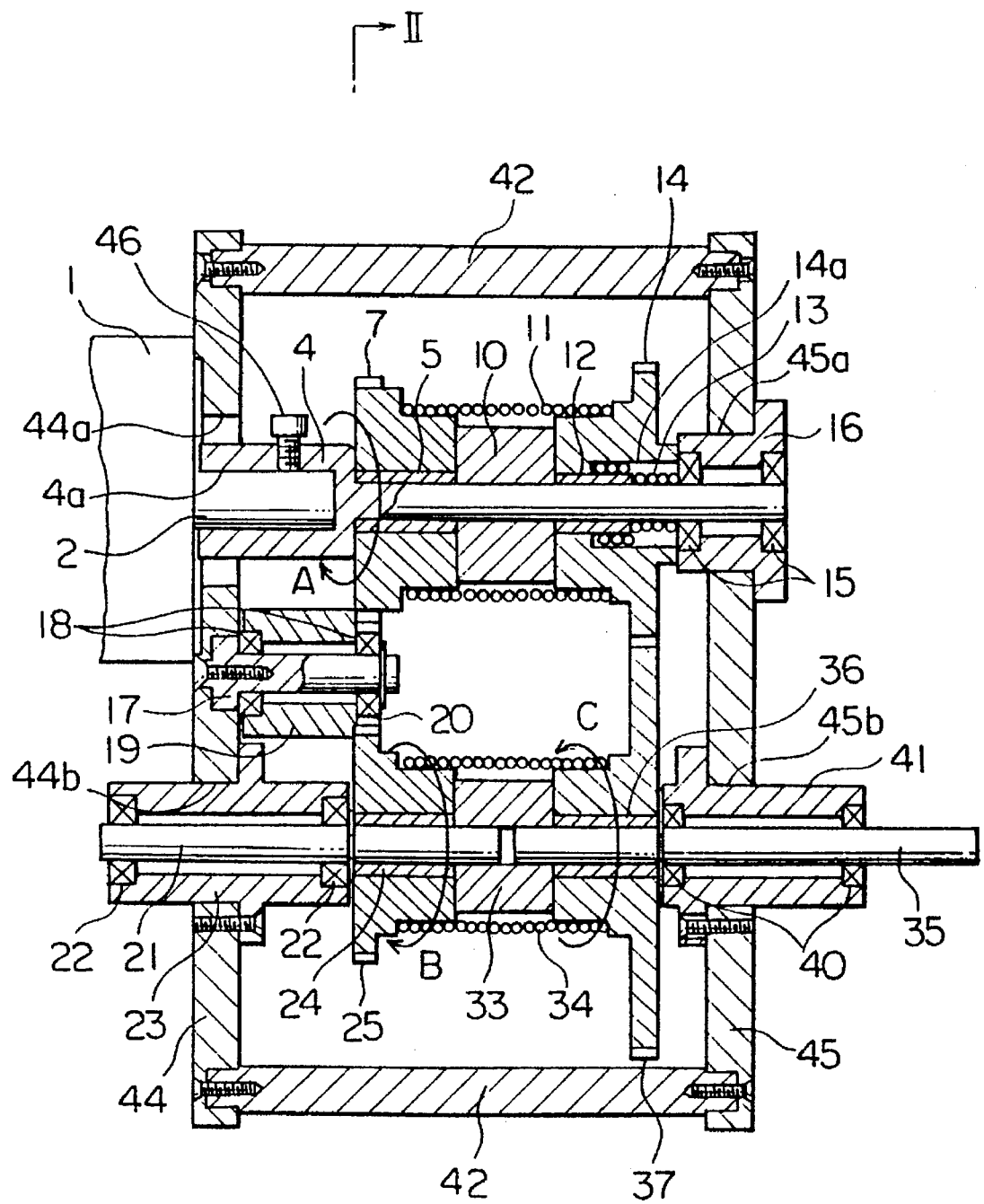
FIG. 1 is a vertical cross section to illustrate an embodiment of the intermittently rotary gearing of the present invention.

In the intermittently rotary gearing of the present invention, an input shaft interlocks with a drive shaft of a motor; a first gear is provided around the input shaft and interlocks with the input shaft when at least the input shaft is rotated in the power output direction of the motor; a second gear is provided around the input shaft and interlocks with the input shaft when at least the input shaft is rotated in the power output direction of the motor; a first coiled spring one end of which is fitted around a boss of the first gear and the other end of which is fitted around a boss of the second gear is provided; a first divisional shaft is provided in parallel to the input shaft; a second divisional shaft is provided coaxially to the first divisional shaft; a third gear is provided around the first divisional shaft and rotatable in the same direction as the first gear via an interlocking means; a fourth gear is provided around the second divisional shaft, and associates with the second gear so as to be rotatable in the direction opposite to the second gear; a second coiled spring one end of which is fitted around a boss of the third gear and the other end of which is fitted around a boss of the fourth gear is provided; and a one-way clutch is fitted around the first divisional shaft and around which the third gear is fitted, and/or a one-way clutch is fitted around the second divisional shaft and around which the fourth gear is fitted.

According to the intermittently rotary gearing of the present invention, when the input shaft is rotated in the preset direction interlockingly with the rotation of a drive shaft of the motor, the first gear and second gear fitted to this input shaft are respectively rotated in the same direction. The first gear transmits the rotation to the third gear to cause the third gear to rotate in the same direction as the first gear. The second gear transmits the rotation to the fourth gear to cause the fourth gear to rotate in the opposite direction.

As the results, a torsional force acts on the second coiled spring one end of which is fitted to the third gear and the other end of which is fitted to the fourth gear, so that the second coiled spring is wind-compressed. Then, once the force at which the second coiled spring is wind-compressed exceeds a preset value, the third gear and fourth gear are reversed, so that the first gear interlocking with the third gear and the second gear interlocking with the fourth gear are reversed. As the result, the input shaft and the drive shaft of the motor are also reversed.

Here, a difference in rotational speed is produced between the second gear and the first gear on account of a difference in rotational speed which is ascribable to the difference between the mass of the third gear and first gear and the mass of the fourth gear and second gear, or a difference in rotational speed which is ascribable to the difference between the gear ratio of the third gear to the first gear and the gear ratio of the fourth gear to the second gear, so that a torsional force acts on the first coiled spring one end of which is fitted to the first gear and the other end of which is fitted to the second gear, so that the first coiled spring is wind-compressed.

Once the wind compression force of the first coiled spring exceeds a preset value, the input shaft and the drive shaft of the motor are more quickly reversed, so that the spring force is released. Thus, once the spring forces are released, the drive shaft of the motor and the input shaft begin to again rotate in the power output direction, and the first coiled spring and the second coiled spring are again wind-compressed.

With repetition of such action, the drive shaft of the motor, the input shaft, and the first gear, second gear, third gear and fourth gear that interlock with it periodically repeat the normal rotation in accordance with the power output rotational direction of the motor (hereinafter often "forward rotation") and the reverse rotation that opposes the power output rotation of the motor (hereinafter often "counter rotation").

Meanwhile, since the one-way clutch is fitted around the first divisional shaft and the third gear is fitted around it, or the one-way clutch is fitted around the second divisional shaft and the fourth gear is fitted around it, the periodical repetitions of forward rotation and counter rotation of the third gear and fourth gear cause the first divisional shaft or second divisional shaft to intermittently rotate in the given direction. Hence, this rotating shaft is used as an output shaft, whereby the intermittent rotary motion can be outputted.

The present invention will be described below in greater detail with reference to the accompanying drawings.

Figure 2:
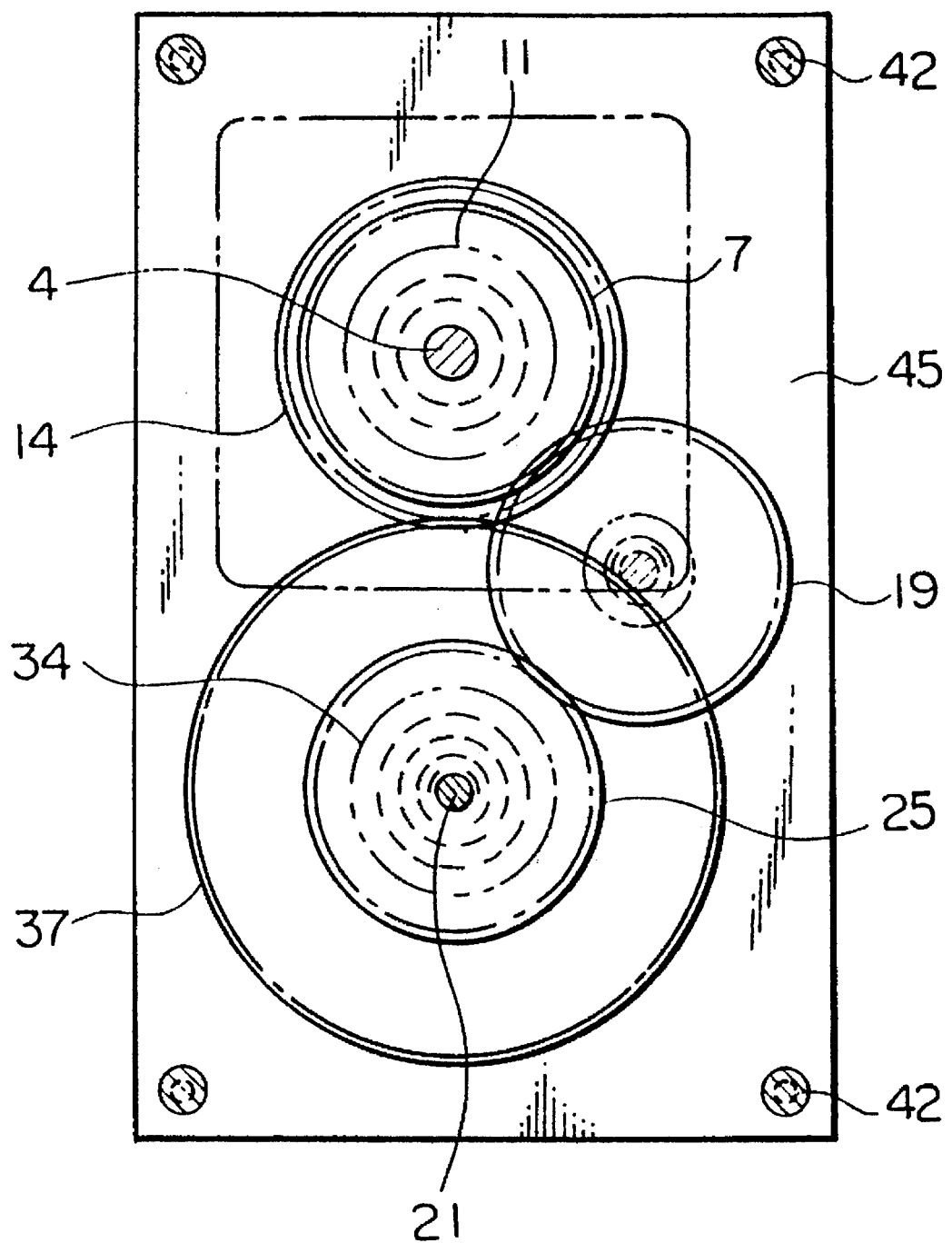
FIG. 2 is a cross section along the line II—II in FIG. 1.

FIGS. 1 and 2 illustrate an embodiment of the intermittently rotary gearing according to the present invention. FIG. 1 is a cross section thereof, and FIG. 2 is a cross section along the line II—II in FIG. 1.

This intermittently rotary gearing has a frame in which a pair of support plates 44 and 45 are put up in parallel by the aid of rod members 42 having the like length, provided at four corners. Through-openings 44a and 44b are made in the one support plate 44. A motor 1 is fitted to the peripheral rim of the one through-opening 44a, and its drive shaft 2 is inserted to the inside of the frame through the through-opening 44a. A cylindrical bearing member 23 is fitted to the other through-opening 44b.

Through-openings 45a and 45b similar to the above through-openings are also made in the support plate 45 facing the above support plate 44. A cylindrical bearing member 16 is fitted to the one through-opening 45a in the manner that it is provided concentrically to the drive shaft 2 of the motor 1. To the other through-opening 45b, a cylindrical bearing member 41 is fitted in the manner that it is provided concentrically to the bearing member 23.

An input shaft 4 comprised of a terraced shaft having a larger diameter at its one end is connected to the drive shaft 2 of the motor 1. More specifically, the input shaft 4 is connected to the drive shaft 2 by inserting the drive shaft 2 to a hole 4a formed at the axis of the larger diameter portion of the input shaft 4 and fastening it by means of a screw 46 from the outside of the larger diameter portion. The other end of the input shaft 4 is inserted to and supported by bearings 15 of the bearing member 16.

A first divisional shaft 21 is inserted to and supported by bearings 22 of the bearing member 23. The first divisional shaft 21 is snap-fitted to the bearing member 23 by means of a snap ring (not shown). A second divisional shaft 35 is also inserted to and supported by bearings 40 of the bearing member 41, set opposingly to the bearing member 23. The second divisional shaft 35 is snap-fitted to the bearing member 41 by means of a snap ring (not shown). Thus, the first divisional shaft 21 and the second divisional shaft 35 are coaxially butted against each other at their inner ends and are supported in parallel to the input shaft 4.

A first gear 7 is provided around one end of the input shaft 4 via a one-way clutch 5. The one-way clutch 5 engages with the input shaft 4 and transmits the rotation of the input shaft 4 to the first gear 7 when the input shaft 4 is rotated in the direction of an arrow A shown in FIG. 1 (the counterclockwise direction as viewed from the right side of the drawing). It runs idle with respect to the input shaft 4 and does not transmit the rotation of the input shaft 4 to the first gear 7 when the input shaft 4 is rotated in the reverse direction. The first gear 7 may otherwise be press-fit inserted to the input shaft 4 or be secured thereto by means of screws or the like.

A second gear 14 is provided around the other end of the input shaft 4 via a one-way clutch 12. The one-way clutch 12 runs idle with respect to the input shaft 4 and does not transmit the rotation of the input shaft 4 to the second gear 14 when the input shaft 4 is rotated in the direction of the arrow A (the counter-clockwise direction as viewed from the right side of the drawing). It engages with the input shaft 4 and transmits the rotation of the input shaft 4 to the second gear 14 when the input shaft 4 is rotated in the reverse direction.

At the inner periphery of the second gear 14, a larger-diameter cavity 14a is formed in the manner it extends from one end thereof to the middle portion. Inside this larger-diameter cavity 14a, a spring clutch 13 is fitted in the manner that one end thereof is brought into close touch with the periphery of the input shaft 4 and the other end thereof is brought into close touch with the periphery of one end of the one-way clutch 12. The spring clutch 13 is wind-compressed when the input shaft 4 is rotated in the direction of the arrow A and transmits the rotation of the input shaft 4 to the one-way clutch and the second gear 14.

A spacer 10 is also fitted around the input shaft 4 at its middle position between the first gear 7 and the second gear 14 so that the first gear 7 and the second gear 14 can be held at a given distance. A first coiled spring 11 is also fitted in the manner that one end of its inner periphery is brought into close touch with the outer periphery of the boss of the first gear 7 and the other end of its inner periphery is brought into close touch with the outer periphery of the boss of the second gear 14. A given gap is formed between the inner periphery of the first coiled spring 11 and the outer periphery of the spacer 10. The first coiled spring 11 is set counter-clockwise so that it can be wind-compressed when the first gear 7 is rotated in the direction of the arrow A and the second gear 14 is rotated in the direction opposite to that of the arrow A.

A third gear 25 is fitted around the first divisional shaft 21 via a one-way clutch 24. When the third gear 25 is rotated in the direction of an arrow B shown in FIG. 1 (the same direction as the direction of the arrow A), the one-way clutch 24 transmits the rotation of the third gear to the first divisional shaft 21. When the first divisional shaft 21 is not used as an output shaft, the one-way clutch 24 may be replaced by a mere bearing member, or the first divisional shaft 21 and the third gear 25 may be fixed together.

A fourth gear 37 is fitted around the second divisional shaft 35 via a one-way clutch 36. When the fourth gear 37 is rotated in the direction of an arrow C shown in FIG. 1 (the direction opposite to that of the arrows A and B), the one-way clutch 36 transmits the rotation of the fourth gear to the second divisional shaft 35. Also, the fourth gear 37 is set engaging with the second gear 14, and the fourth gear 37 has a larger diameter and more gear teeth than the second gear 14.

Thus, the gear ratio of the first gear 7 to the third gear 25 is different from the gear ratio of the second gear 14 to the fourth gear 37. This is, at the time of the reverse rotation described later, contributes to the difference in rotational speed which is produced between the first gear 7 and the second gear 14 to impart a wind compression force to the first coiled spring 11. Alternatively, the difference in rotational speed may be produced by utilizing the difference between the mass of the third gear 25 and first gear 7 and the mass of the fourth gear 37 and second gear 14.

A spacer 33 is fitted around the first divisional shaft 21 and second divisional shaft 35 at their butted position so that the third gear 25 and the fourth gear 37 can be held at a given distance. A second coiled spring 34 is also fitted in the manner that one end of its inner periphery is brought into close touch with the outer periphery of the boss of the third gear 25 and the other end of its inner periphery is brought into close touch with the outer periphery of the boss of the fourth gear 37. A given gap is formed between the inner periphery of the second coiled spring 34 and the outer periphery of the spacer 33. The second coiled spring 34 is set counterclockwise so that it can be wind-compressed when the third gear 25 is rotated in the direction of the arrow B and the fourth gear 37 is rotated in the direction of the arrow C.

A support shaft 17 is fitted to the one support plate 44 substantially sideways at the middle of the support plate 44, and an idle gear 19 is fitted around this support shaft 17 via bearings 18. The idle gear 19 is set engaging with the first gear 7 and third gear 25. In FIG. 1, reference numeral 20 denotes a snap ring.

The intermittently rotary gearing made up as described above is operated in the manner as described below. In the present embodiment, the second divisional shaft 35 is used as the output shaft. However, the first divisional shaft 21 may be used as the output shaft, or both the first divisional shaft 21 and the second divisional shaft 35 may be used as output shafts.

First, the drive shaft 2 of the motor 1 is rotated in the direction of the arrow A, and the input shaft 4 is rotated in the same direction, whereupon the first gear 7 is rotated in the same direction via the one-way clutch 5 and also the second gear 14 is rotated in the same direction via the spring clutch 13 and the one-way clutch 12.

The rotation of the first gear 7 is transmitted to the third gear 25 through the idle gear 19, and the third gear 25 is rotated in the direction of the arrow B. The rotation of the second gear 14 is also transmitted to the fourth gear 37 engaging with the second gear 14, and the fourth gear 37 is rotated in the direction of the arrow C.

Now, since the third gear 25 and the fourth gear 37 are rotated in the opposite directions and also in the direction where the second coiled spring 34 is wind-compressed, the second coiled spring 34 is wind-compressed and its inner periphery comes into close contact with the outer periphery of the spacer 33 until it is no longer wind-compressed, whereupon the fourth gear 37 is reversed. Here, the third gear 25 is also reversed.

Once the fourth gear 37 is reversed, the second gear 14 is rotated in the direction opposite to that of the arrow A. Here, the rotation on the side of the one-way clutch 12 does not cause the spring clutch 13 to be wind-compressed. Also, in the above direction of rotation, the one-way clutch 12 runs idle with respect to the input shaft 4.

Meanwhile, once the third gear 25 is reversed, the first gear is also reversed to reversely rotate the input shaft 4 and the drive shaft 2 via the one-way clutch 5. In this case, the first gear 7 is reversed in the direction identical to the direction in which the second gear 14 is reversed. Now, since the gear ratio of the third gear 25 to the first gear is different from the gear ratio of the fourth gear 37 to the second gear 14, the second gear 14 is more quickly reversed with respect to the first gear. As the result, a wind compression force is produced in the first coiled spring, and thus the first coiled spring 11 is wind-compressed. Then, the inner periphery of the first coiled spring 11 comes into close contact with the outer periphery of the spacer 10 until it is no longer wind-compressed, whereupon the first gear 7 is more quickly reversed in the direction opposite to that of the arrow A, and the input shaft 4 and the drive shaft 2 are more quickly reversed reversed via the one-way clutch 5.

In this way the forces of the wind-compressed second coiled spring 34 and first coiled spring 11 are released, whereupon the drive shaft 2 and input shaft 4 are forward rotated by the output of power from the motor 1, the third gear 25 is rotated in the direction of the arrow B via the idle gear 19, and the fourth gear 37 is rotated in the direction of the arrow C. With repetition of such a process, the fourth gear 37 periodically repeats the rotation in the direction of the arrow C and the rotation reverse thereto.

Now, the one-way clutch 36 provided along the inner periphery of the fourth gear 37 transmits its rotational force to the second divisional shaft 35 when the fourth gear 37 is rotated in the direction of the arrow C. It, on the other hand, runs idle and does not transmit its rotational force to the second divisional shaft 35 when the fourth gear 37 is rotated in the direction opposite to that of the arrow C. As the result, the second divisional shaft 35 is intermittently rotated in the direction of the arrow C, so that its rotational force can be taken out as an output power.

Figure 3:
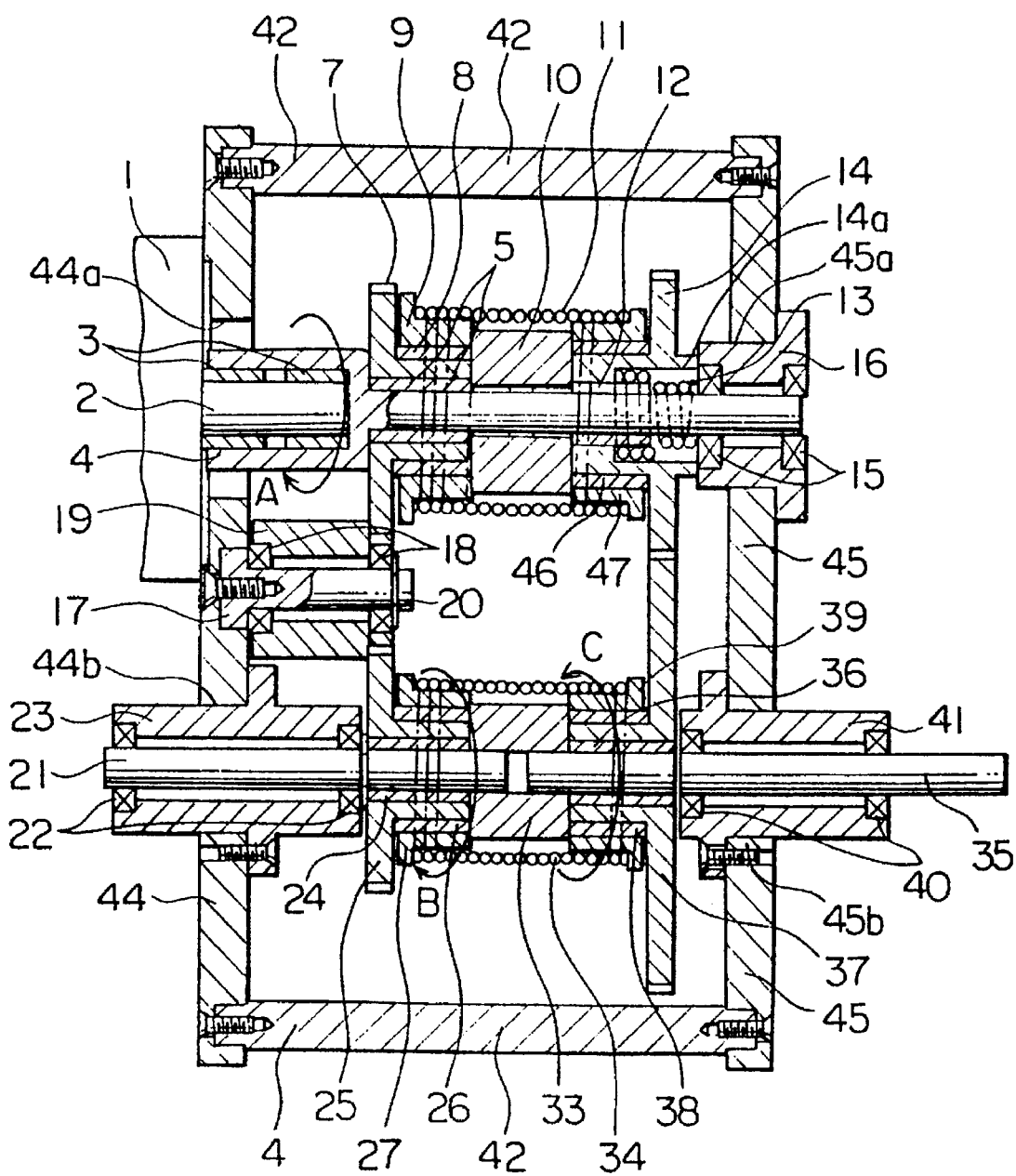
FIG. 3 is a vertical cross section to illustrate another embodiment of the intermittently rotary gearing of the present invention.

FIG. 3 illustrates another embodiment of the intermittently rotary gearing of the present invention.

This embodiment basically does not differ from the embodiment described above. Thus, substantially the like constituents are denoted by the like reference numerals to omit the description thereon, and different constituents only will be described below.

In this embodiment, two one-way clutches 3 that engage in different directions are provided side by side in the axial direction along the inner periphery of the cavity formed at the center of the larger-diameter portion of the input shaft 4. The drive shaft 2 of the motor is inserted so as to fit to the inner peripheries of these one-way clutches 3. The input shaft 4 and the drive shaft 2 are connected in this way. These two one-way clutches 3 engage in opposite directions, and hence the rotational force is transmitted to the input shaft 4 when the drive shaft 2 is rotated in either direction.

A cylindrical, first spring support 9 is fitted around the boss of the first gear 7 via a one-way clutch 8. When the first gear 7 is rotated in the direction of the arrow A, the one-way clutch 8 transmits its rotational force to the first spring support 9. Similarly, a cylindrical, second spring support 47 is fitted around the boss of the second gear 14 via a one-way clutch 46. When the second gear 14 is rotated in the direction opposite to that of the arrow A, the one-way clutch 46 transmits its rotational force to the second spring support 47. The first coiled spring 11 is fitted in the manner that one end thereof is brought into close touch with the first spring support 9 and the other end thereof is brought into close touch with the second spring support 47.

A cylindrical, third spring support 27 is also fitted around the boss of the third gear 25 via a one-way clutch 26. When the third gear 25 is rotated in the direction of the arrow B (the same direction as that of the arrow A), the one-way clutch 26 transmits its rotational force to the third spring support 27. Similarly, a cylindrical, fourth spring support 39 is fitted around the boss of the fourth gear 37 via a one-way clutch 38. When the fourth gear 37 is rotated in the direction of the arrow C, the one-way clutch 38 transmits its rotational force to the fourth spring support 39. The second coiled spring 34 is fitted in the manner that one end thereof is brought into close touch with the third spring support 27 and the other end thereof is brought into close touch with the fourth spring support 38.

Other construction is substantially the same as that in the embodiment shown in FIGS. 1 and 2. Also, the intermittently rotary gearing according to this second embodiment is operated basically in the same manner as the first embodiment shown in FIGS. 1 and 2.

What differs in this second embodiment is that the first coiled spring 11 and the second coiled spring 34 are fitted to the spring supports 9 and 27 and spring supports 27 and 39, respectively, which are fitted around the bosses of the first gear 7, second gear 14, third gear 25 and fourth gear 37 via the one-way clutches 8, 46, 26 and 38, respectively, whereby any slip loss can be made smaller when the rotational forces in the direction of winding compression are applied to the ends of the respective first coiled spring 11 and second coiled spring 34. As the result, the winding compression and unwinding of the first coiled spring 11 and second coiled spring 34 can be exactly switched.

The one-way clutches used in the present invention may preferably be any known roller type one-way clutches. For example, "Shell Type Roller Clutch" (trade name, manufactured by Nippon Seiko K. K. may be used. In place of the roller type one-way clutches, known spring clutches may also be used.

In the above embodiments, the idle gear 19 is used as an interlocking means of the first gear 7 and third gear 25. Alternatively, it is also possible to use a timing belt in place of the idle gear 19. In such a case, the first gear 7 and third gear 25 are replaced with toothed pulleys, In the present invention, what is meant by gears embraces the whole rotation transmission means having teeth along its periphery, as exemplified by toothed pulleys.

TEXT EXAMPLE

As constituent parts of the intermittently rotary gearing shown in FIG. 3, those as shown in Table 1 below were used to produce the intermittently rotary gearing of FIG. 3.

TABLE 1

| | |
|---|---|
| First gear 7: | 60 mm diameter, 60 gear teeth |
| Idle gear 19: | 60 mm diameter, 60 gear teeth |
| Third gear 25: | 60 mm diameter, 60 gear teeth |
| Second gear 14: | 80 mm diameter, 80 gear teeth |
| Fourth gear 37: | 120 mm diameter, 120 gear teeth |
| First coiled spring 11: | 48 mm coil diameter, 2.6 mm wire diameter, made of music wire, 9 coils, counterclockwise coiled, 35 kgf · mm/rad spring constant |
| Second coiled spring 11: | 45 mm coil diameter, 2.6 mm wire diameter, made of music wire, 9 coils, counterclockwise coiled, 35 kgf · mm/rad spring constant |

As the motor 1, a commercially available general-purpose motor was used, the motor being electrically variable-speed and continuously rotatable, and its drive shaft 2 was set at a rotational speed of 60 r.p.m. The rotary motion of the second divisional shaft 35 serving as the output shaft was measured in the following way: A gear sensor (which detects the number of gear teeth in the state of non-contact with the tooth faces) was provided at tooth faces of the fourth gear 37 fitted around the second divisional shaft 35, and the number of gear teeth passing per minute was counted. This number of gear teeth was measured using a digital display unit (manufactured by K. K. Furusato Seimitsu Kikai Seisakusho). Then, angular velocity was determined from the number of passing teeth to measure changes in angular velocity with lapse of time. Results obtained were as shown in FIG. 4.

Figure 4:
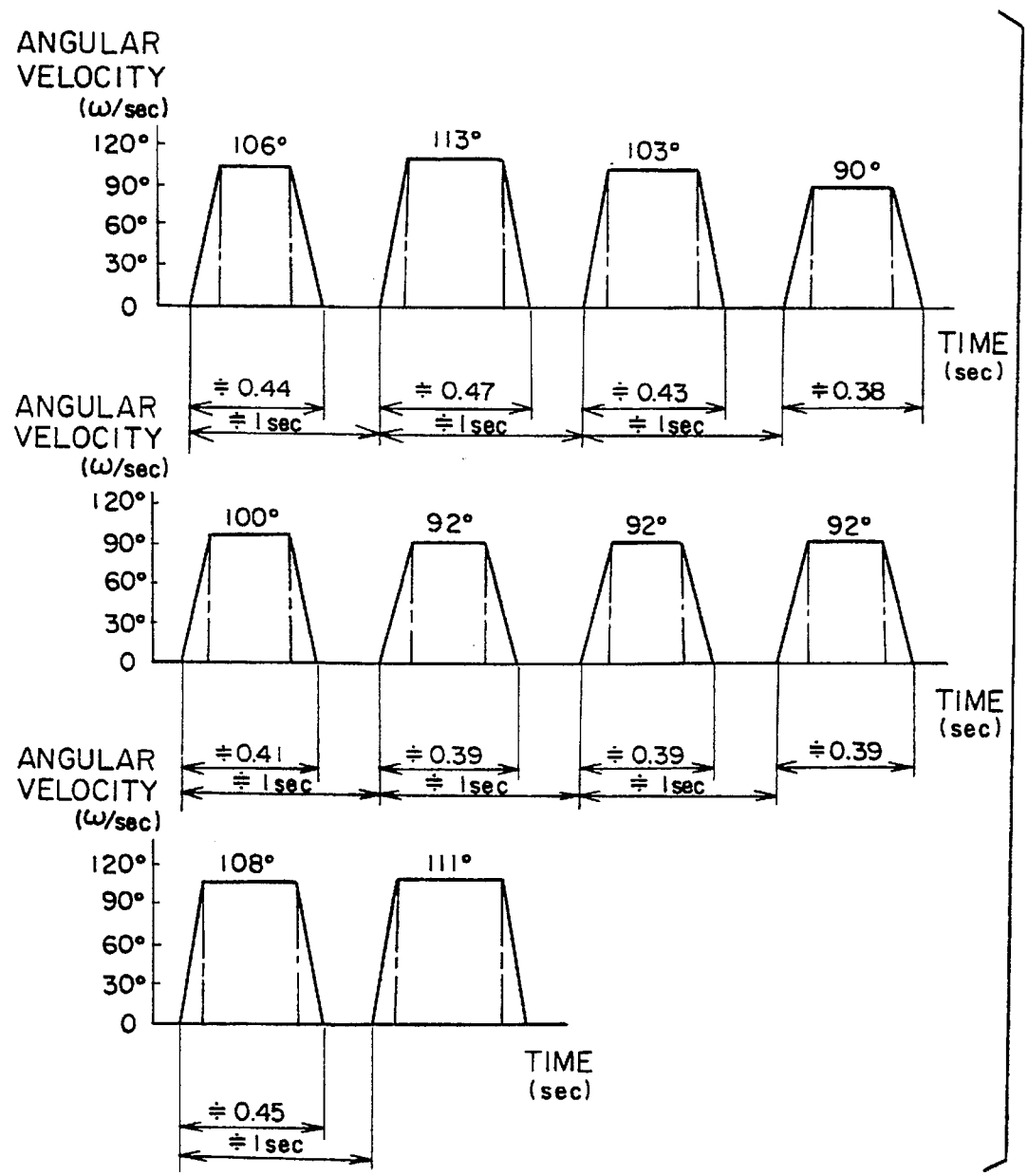
FIG. 4 graphically shows results obtained when changes in the rotational speed of an output shaft were measured in a test example of the present invention.

As shown in FIG. 4, the divisional shaft 35 serving as the output shaft was intermittently rotated at a period of about 1 second, and the maximum rotational speed (angular velocity) at the time of rotation was in the range of from 90°/second to 113°/second, which was substantially constant.

As described above, according to the present invention, the rotary motion of a motor can be converted to intermittent rotary motion by utilizing a mechanical structure. Moreover, since it can be constructed with gears, coiled springs, one-way clutches and so forth that require no strict designing and processing, it can be manufactured at a relatively low cost.

What is claimed is:

1. An intermittently rotary gearing comprising:

an input shaft interlocking with a drive shaft of a motor;

a first gear provided around said input shaft and interlocking with said input shaft when at least the input shaft is rotated in the power output direction of the motor;

a second gear provided around said input shaft and interlocking with said input shaft when at least the input shaft is rotated in the power output direction of the motor;

a first coiled spring one end of which is fitted around a boss of said first gear and the other end of which is fitted around a boss of said second gear;

a first divisional shaft provided in parallel to said input shaft;

a second divisional shaft provided coaxially to said first divisional shaft;

a third gear provided around said first divisional shaft and rotatable in the same direction as said first gear via an interlocking means;

a fourth gear provided around said second divisional shaft, and engaging with said second gear so as to be rotatable in the direction opposite to said second gear;

a second coiled spring one end of which is fitted around a boss of said third gear and the other end of which is fitted around a boss of said fourth gear; and a one-way clutch fitted around said first divisional shaft and around which said third gear is fitted and/or a one-way clutch fitted around said second divisional shaft and around which said fourth gear is fitted.

2. The intermittently rotary gearing according to claim 1, wherein said first gear is fitted around said input shaft via a one-way clutch that transmits the rotation of said input shaft to said first gear when the input shaft is rotated in the power output direction of the motor, and said second gear is fitted around said input shaft via a spring clutch that transmits the rotation of said input shaft to said second gear when the input shaft is rotated in the power output direction of the motor.

3. The intermittently rotary gearing according to claim 1, wherein:

a first spring support is fitted around the boss of said first gear via a one-way clutch that transmits the rotation of said first gear when the first gear is rotated in the power output direction of the motor;

a second spring support is fitted around the boss of said second gear via a one-way clutch that transmits the rotation of said second gear when the second gear is rotated in the direction opposite to the power output direction of the motor;

said first coiled spring is fitted, at one end thereof, to said first spring support and is fitted, at the other end thereof, to said second spring support;

a third spring support is fitted around the boss of said third gear via a one-way clutch that transmits the rotation of said third gear when the third gear is rotated in the power output direction of the motor;

a fourth spring support is fitted around the boss of said fourth gear via a one-way clutch that transmits the rotation of said fourth gear when the fourth gear is rotated in the direction opposite to the power output direction of the motor; and said second coiled spring is fitted, at one end thereof, to said third spring support and is fitted, at the other end thereof, to said fourth spring support.

* * * * *